United States Patent
DeGuile et al.

(10) Patent No.: US 9,358,931 B2
(45) Date of Patent: Jun. 7, 2016

(54) ADAPTER FOR VEHICLE MOUNT AND METHOD OF USE THEREOF

(71) Applicants: Bernhardt D. DeGuile, Nassau, NY (US); Debra A. DeGuile, Nassau, NY (US)

(72) Inventors: Bernhardt D. DeGuile, Nassau, NY (US); Debra A. DeGuile, Nassau, NY (US)

(73) Assignee: O'POC, LLC, East Schodack, NY (US)

( * ) Notice: Subject to any disclaimer, the term of this patent is extended or adjusted under 35 U.S.C. 154(b) by 203 days.

(21) Appl. No.: 13/753,601

(22) Filed: Jan. 30, 2013

(65) Prior Publication Data

US 2014/0209647 A1    Jul. 31, 2014

(51) Int. Cl.
*B60R 9/04* (2006.01)
*B60R 9/048* (2006.01)
*B60R 9/058* (2006.01)
*B60R 9/00* (2006.01)

(52) U.S. Cl.
CPC ............. *B60R 9/00* (2013.01); *Y10T 29/49947* (2015.01)

(58) Field of Classification Search
CPC .................................... B60R 9/06; B60R 9/10
USPC ........................ 224/319, 309, 324, 329, 924
See application file for complete search history.

(56) References Cited

U.S. PATENT DOCUMENTS

| | | | | | |
|---|---|---|---|---|---|
| 3,473,773 | A | * | 10/1969 | Meyer | 248/222.41 |
| 4,867,362 | A | * | 9/1989 | Finnegan et al. | 224/319 |
| 5,090,605 | A | * | 2/1992 | Cucheran | 224/321 |
| 5,377,888 | A | * | 1/1995 | Baravalle | 224/309 |
| 5,531,367 | A | * | 7/1996 | Ravier | 224/329 |
| 5,738,258 | A | * | 4/1998 | Farrow et al. | 224/324 |
| 6,761,296 | B2 | * | 7/2004 | Ford et al. | 224/310 |
| 6,892,913 | B1 | * | 5/2005 | Andersson | 224/319 |
| 7,108,163 | B1 | * | 9/2006 | Pedrini | 224/319 |
| 7,857,179 | B1 | * | 12/2010 | Allen et al. | 224/504 |
| 8,517,237 | B1 | * | 8/2013 | Barber | 224/316 |
| 8,733,605 | B2 | * | 5/2014 | Pedrini | 224/488 |
| 8,757,462 | B2 | * | 6/2014 | Pedrini | 224/572 |
| 2006/0196905 | A1 | * | 9/2006 | Shaukat | 224/321 |

* cited by examiner

*Primary Examiner* — Brian D Nash
*Assistant Examiner* — Derek Battisti
(74) *Attorney, Agent, or Firm* — Schmeiser, Olsen & Watts, LLP

(57) ABSTRACT

An adapter for a vehicle mount having a base portion having a top surface and a bottom surface, the bottom surface having a high friction element, the high friction element reducing a lateral movement of the base portion when positioned on an exterior surface of vehicle, and a receiver disposed on the base portion, the receiver configured to receive a portion of a vehicle mount, wherein a load of the vehicle mount is distributed across the surface area of the base portion is provided. Furthermore, an associated method is also provided.

12 Claims, 8 Drawing Sheets

ADAPTER FOR VEHICLE MOUNT AND METHOD OF USE THEREOF

FIELD OF TECHNOLOGY

The following relates to an adapter for vehicle mounts and more specifically to embodiments of an adapter for load distribution and movement reduction of a vehicle mount and surface protection of a vehicle.

BACKGROUND

Conventional vehicle trunk mounts have at least one bar that rests upon a trunk of a car. Those bars are usually made of metal or a heavy plastic that can dent the trunk of the car, scratch the paint on the trunk, and leave dirt and residue from the direct contact with the trunk of the car. While some vehicle trunk mounts place padding over the bar or portion that rests on the trunk, the weight of the vehicle trunk mount, along with any objects attached to the mount, can still deliver permanent damage to the trunk of the car. Moreover, the diameter of the bar of the vehicle trunk mount is relatively small, which focuses the entire load of the mount and attached objects onto a small area of the trunk, and allows for easy sliding of the bar across the trunk, which causes further damage to the car trunk.

Thus, a need exists for an apparatus and method for providing protection against damage to a vehicle by distributing a load of a vehicle mount and reducing a sliding effect of the vehicle mount.

SUMMARY

A first aspect relates generally to an adapter for a vehicle mount comprising a base portion having a top surface and a bottom surface, the bottom surface having a high friction element, the high friction element reducing a lateral movement of the base portion when positioned on an exterior surface of vehicle, and a receiver disposed on the base portion, the receiver configured to receive a portion of a vehicle mount, wherein a load of the vehicle mount is distributed across the surface area of the base portion.

A second aspect relates generally to an adapter comprising a base portion having a top surface and a bottom surface, the bottom surface comprising a high friction element, the base portion configured to be disposed on a mounting surface of a vehicle, and a receiver disposed on the top surface of the base portion, the receiver having a first side portion and a second side portion extending axially from a first end of the receiver to a second end of the receiver, wherein the receiver is configured to receive a vehicle engagement member of a vehicle mount so that the vehicle engagement member resides at least partially between the first side portion and the second side portion of the receiver, wherein the receiving of the vehicle engagement member of the vehicle mount by the receiver securably retains the vehicle engagement member when the vehicle mount is operably attached to the vehicle.

A third aspect relates generally to a method comprising providing an adapter having a base portion having a top surface and a bottom surface, the bottom surface having a high friction element, the high friction element reducing a lateral movement of the base portion when positioned on an exterior surface of vehicle, a receiver disposed on the base portion, preventing a vehicle engagement member of a vehicle mount to directly contact the exterior surface of the vehicle and the vehicle engagement member, and distributing a load of the vehicle mount across a surface area of the base portion.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
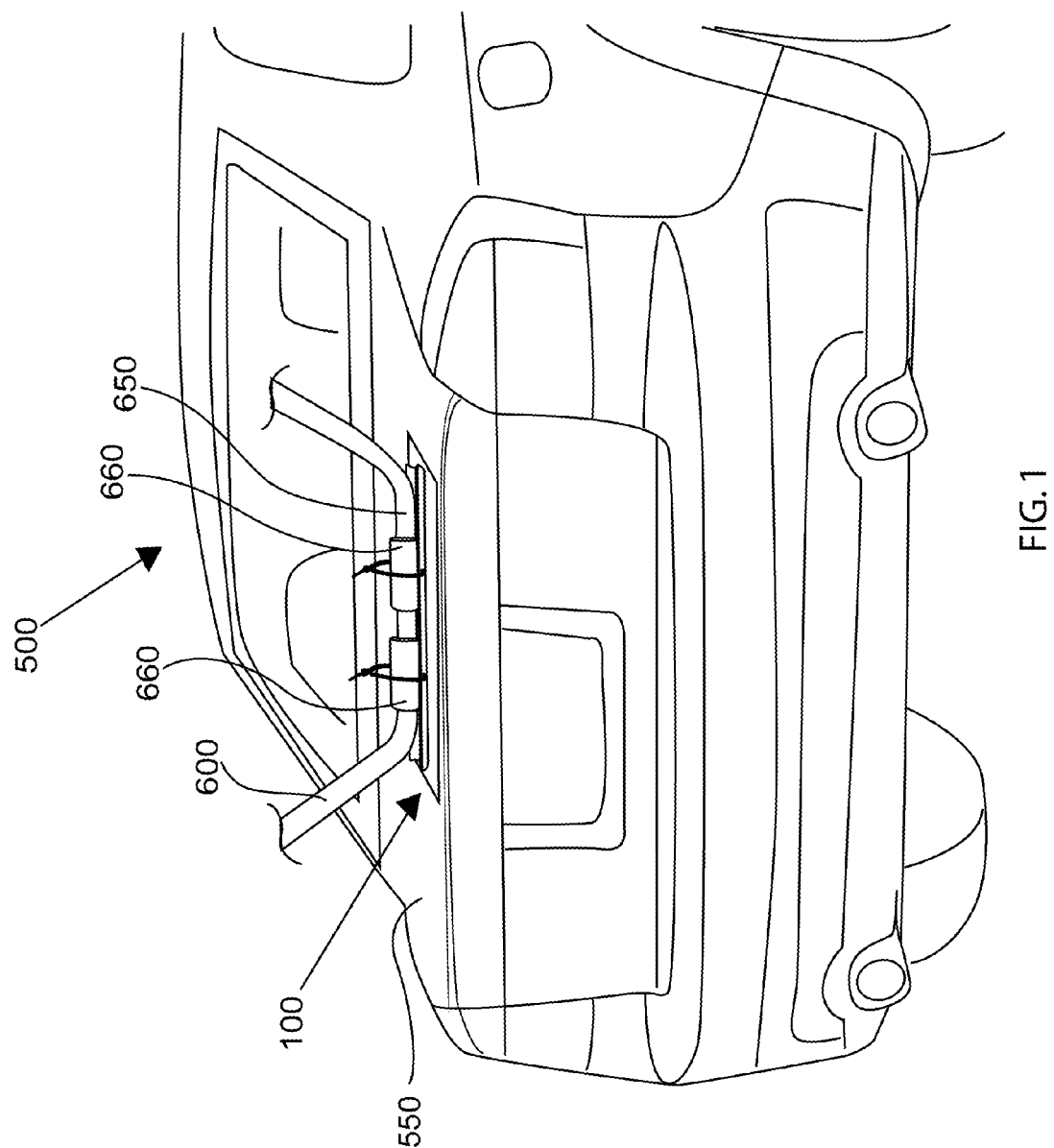
FIG. 1 depicts a perspective view of an embodiment of an adapter disposed on a vehicle for use with a vehicle mount.

Referring to the drawings, FIG. 1 depicts an embodiment of an adapter 100 used on a vehicle 500. Embodiments of the adapter 100 may be for use on a vehicle 500 to accommodate a vehicle mount 600. Embodiments of the vehicle 500 may be an automobile or any type of vehicle, such as a passenger vehicle, a car, a truck, a van, a sport utility vehicle, and the like. The vehicle 500 may have a mounting surface 550. Embodiments of the mounting surface 550 of the vehicle 500 may be an exterior surface of the vehicle 500. In an exemplary embodiment, the mounting surface 550 may be a top or external surface of a trunk of the vehicle 500, or an exterior surface proximate or otherwise near a rear of the vehicle 500. Moreover, embodiments of the vehicle mount 600 may be a conventional vehicle mount adapted to operably attach to the vehicle. The vehicle mount 600 may be a bike rack, a sports rack, a ski rack, a snowboard rack, a surfboard rack, a kayak rack, a canoe rack, and the like, or any rack or mount configured to engage a vehicle, such as vehicle 500, at one or more locations. For example, embodiments of the vehicle mount 600 may include a vehicle engagement member 650 configured to engage, contact, mechanically interfere, touch, etc., the mounting surface 550 of the vehicle 500. Embodiments of the vehicle engagement member 650 may be a portion of the vehicle mount 600 that directly contacts a mounting surface 550 at one or more locations to help support the vehicle mount 600 and/or facilitate operable attachment to the vehicle 500. For instance, embodiments of the vehicle engagement member 650 may be a cross-bar, a support member, a round bar, a rod, a segment, a structural member, a cross-member, a leg, an arm, or any member of the vehicle mount 600 having a cross-section and configured to contact the mounting surface 550 of the vehicle 500. The vehicle engagement member 650 may have a circular or curvilinear cross-section, but may also have a square or rectangular cross-section.

Furthermore, some embodiments of the vehicle engagement member 650 may include one or more foam pads 660 wrapped around the vehicle engagement member 650 in an attempt to reduce damage cause by the engagement between the vehicle engagement member 650 and the mounting surface 550 of the vehicle 500. However, the pads 660 are insufficient in completely protecting the mounting surface 550 because they do not cover the entire vehicle engagement member 650, they do not evenly distribute the load of the vehicle mount 600, and they do not reduce movement of the vehicle engagement member 650 across the mounting surface 550 when the vehicle mount 600 is urged to slide during transit or loading and unloading objects onto the vehicle mount 600. Accordingly, embodiments of the adapter 100 may completely prevent contact or engagement between the vehicle engagement member 650 and the mounting surface 550 of the vehicle 500. Furthermore, embodiments of the adapter 100 may distribute, evenly or otherwise, a load of the vehicle mount when operably attached to the vehicle 500. For instance, embodiments of the adapter 100 may evenly distribute the load, weight, force, etc., of the vehicle mount 600 across a larger surface area of the mounting surface 550, as opposed to a focused point of contact between the vehicle engagement member 650 and the mounting surface 550. Even further, embodiments of the adapter 100 may reduce or prevent slippage or sliding of the vehicle mount 600 across the mounting surface 550.

Figure 2:
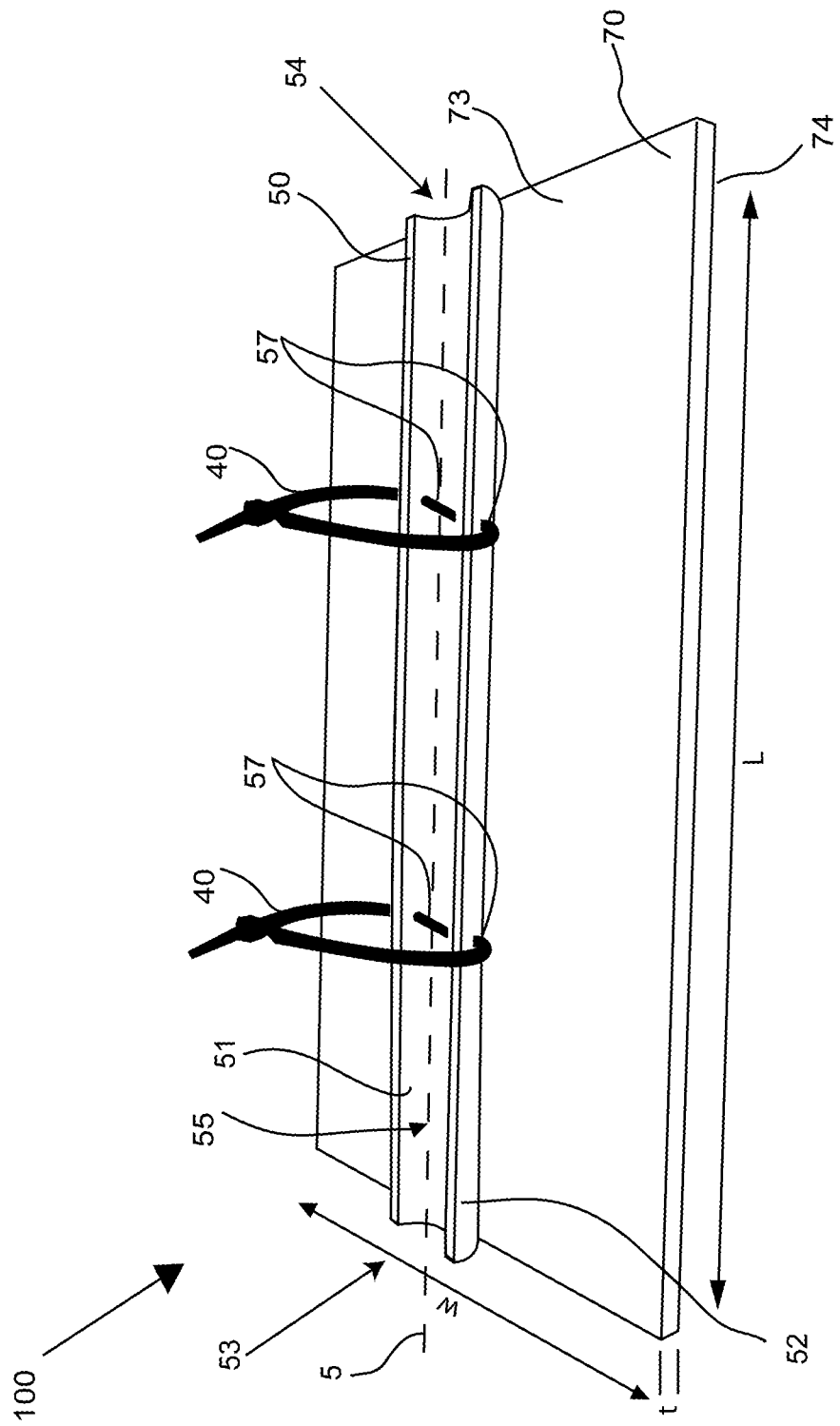
FIG. 2 depicts a front, elevated view of an embodiment of the adapter.
Figure 3:
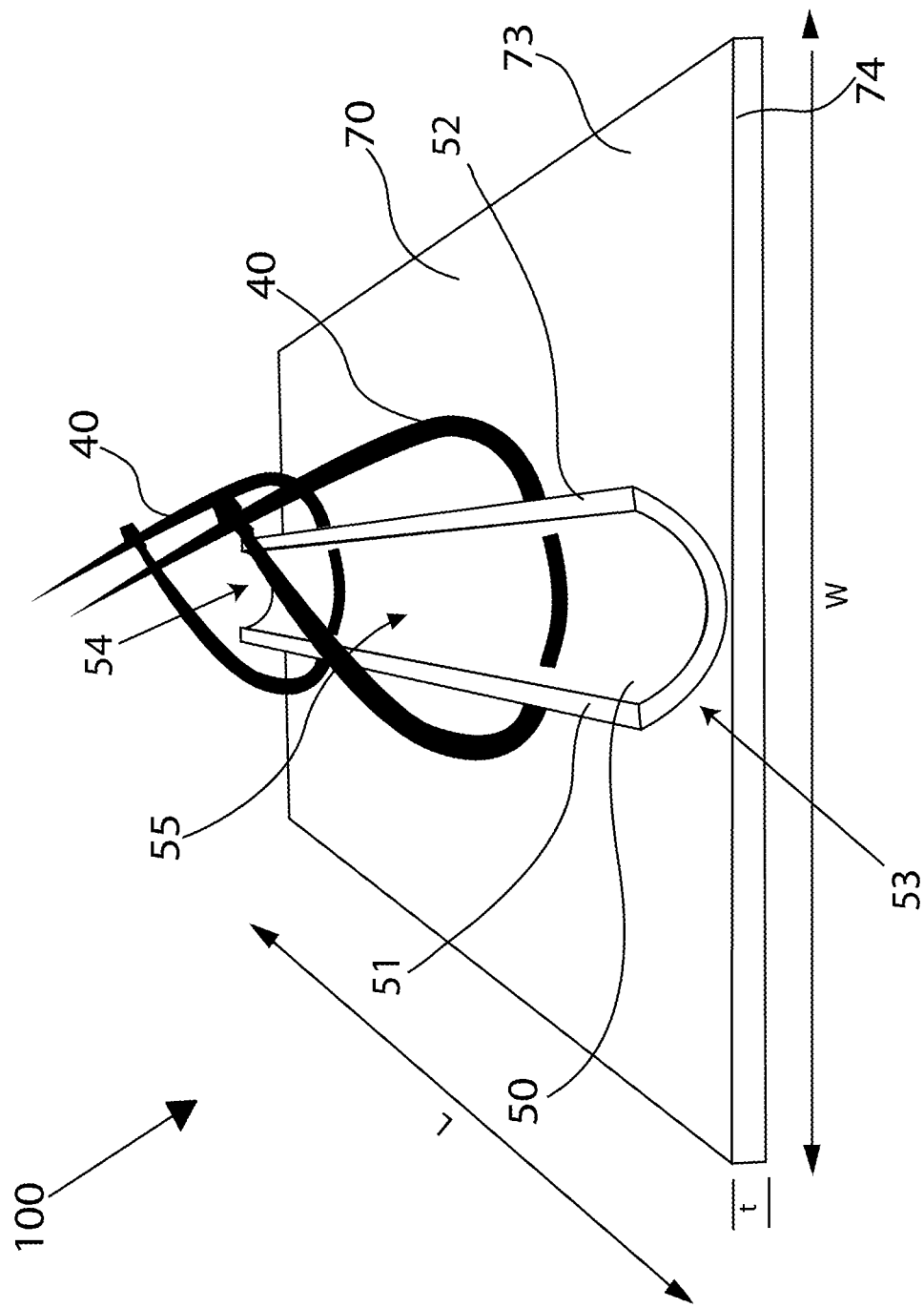
FIG. 3 depicts a side, elevated view of an embodiment of the adapter.

Referring now to FIGS. 2 and 3, embodiments of adapter 100 may include a base portion 70 and a receiver 50. Embodiments of the adapter 100 may include a base portion 70 having a top surface 73 and a bottom surface 74, the bottom surface 74 having a high friction element 77, the high friction element 77 reducing a lateral movement of the base portion 70 when positioned on an exterior surface 550 of vehicle 500, a receiver 50 disposed on the base portion 70, the receiver 50 configured to receive a portion 650 of a vehicle mount 600, wherein a load of the vehicle mount 600 is distributed across the surface area of the base portion 70.

Embodiments of the adapter 100 may include a base portion 70. Embodiments of the base portion 70 may be a load distribution member configured to evenly distribute a load of the vehicle mount 600 and any objects attached thereto across a larger surface area of the mounting surface 550 of the vehicle 500. In other words, the load, force, weight, etc., of the vehicle mount 600 and any objects attached thereto is transferred to the mounting surface 550 (e.g. exterior surface of a trunk) over an area equal to or approximately equal to an area of the base portion 70. Embodiments of the base portion 70 may also be movement restriction member configured to reduce, restrict, prevent, hinder, etc., translational movement or sliding of the vehicle mount 600, in particular, the vehicle engagement member 650 across the mounting surface 550 of the vehicle 500.

Moreover, embodiments of the base portion 70 may have a top surface 73, a bottom surface 74, a width, w, a length, L, and a thickness, t. The base portion 70 may have a rectangular shape. For example, in one exemplary embodiment, the base portion 70 may have a length, L, of 14", a width, w, of 5", and a thickness, t, of ¼". However, those skilled in the art should appreciate that the base portion 70 may include various dimensions to accommodate various sizes of vehicle mounts 600 and mounting surfaces 550 of vehicles 500. For example, embodiments of the base portion may be rectangular, squared, circular, or have any polygonal configuration. Embodiments of the base portion 70 may be disposed on the mounting surface 550 of the vehicle 500 at a location proximate or otherwise near a location where the vehicle engagement member 650 would contact the mounting surface 550 of the vehicle 500, wherein the bottom surface 74 can directly physically engages the mounting surface 550 of the vehicle.

Figure 4:
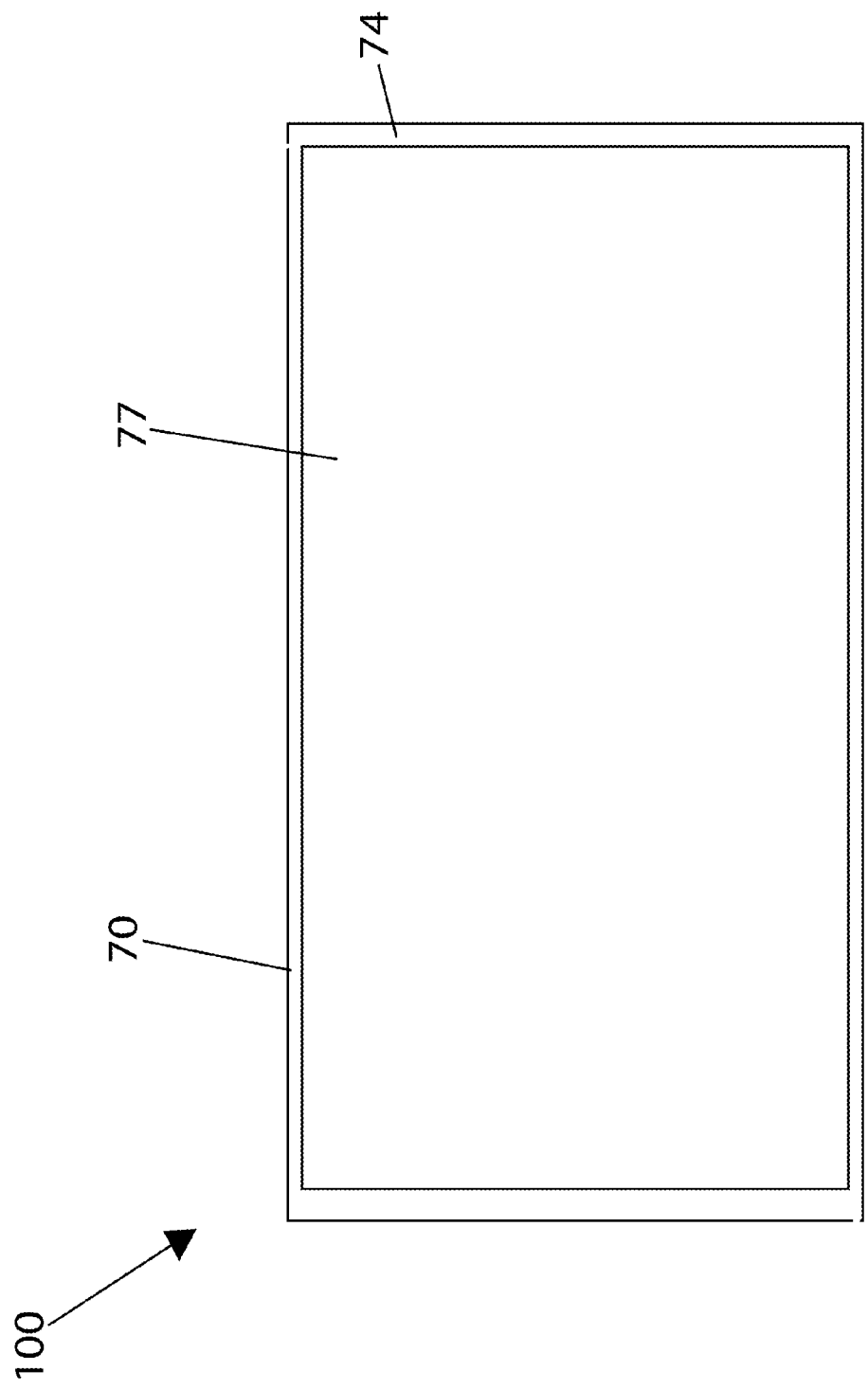
FIG. 4 depicts a bottom view of an embodiment of the adapter having an embodiment of a high friction element.
Figure 5:
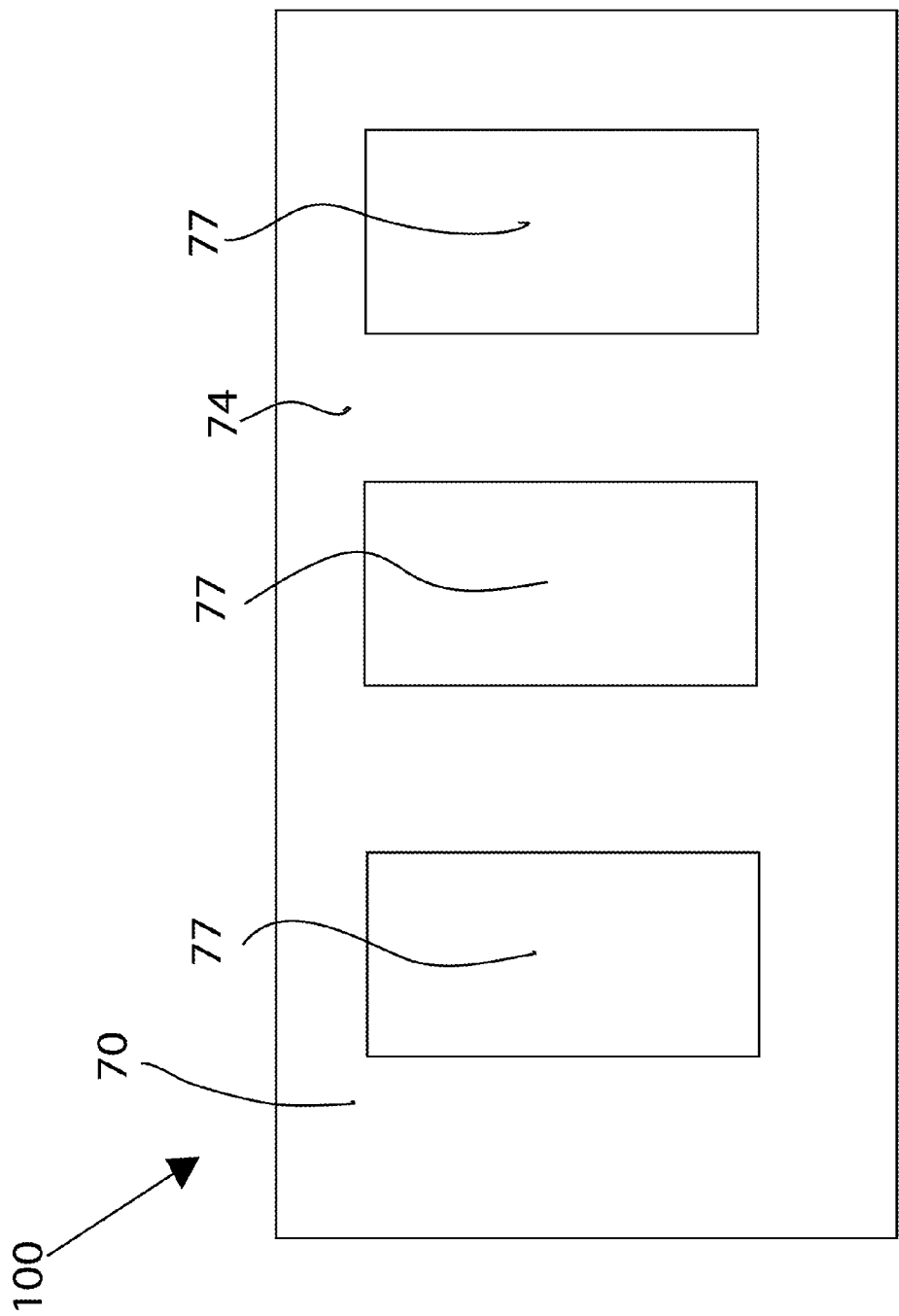
FIG. 5 depicts a bottom view of an embodiment of the adapter having a plurality of high friction elements.

FIGS. 4 and 5 depict embodiments of the base portion 70 having one or more high friction elements 77. Embodiments of the bottom surface 74 of the base portion 70 may include one or more high friction elements 77 to reduce, prevent, hinder, restrict, eliminate, or stop a sliding movement of the vehicle engagement member 650 across the mounting surface 550. As shown in FIG. 4, embodiments of the base portion 70 may include a single high friction element 77 completely or substantially covering the bottom surface 74 of the base portion 70. Alternatively, FIG. 5 shows an embodiment of the base portion 70 including a plurality of high friction elements 77 disposed on the bottom surface 74 of the base portion 70. Embodiments of a high friction element 77 may be a section of material having a high sliding resistance over another material, or a high coefficient of friction, $\mu$, wherein the other material is the mounting surface 550 of the vehicle. Sliding resistance or the coefficient of friction may be defined by the equation $\mu = F/N$ where F is a tangential force required to produce sliding between two solid surfaces and N is a normal force between the surfaces. In other words, embodiments of the high friction element 77 may increase friction between the base portion 70 and the mounting surface 550 of the vehicle 500. Some embodiments of a high friction element 77 may be a section of rubber, a rubber pad, a spray-on rubber coating on the bottom surface 74, a material having a rough surface, an adhesive pad or material, a sticky material, or any material known to those having skill in the art that increase increases friction between two surfaces. Alternatively, embodiments of the base portion 70 could be comprised entirely of a high friction element. In this alternative embodiment, the base portion 70 could forego the placement of one or more high friction elements 77 on the bottom surface 74 of the base portion 70. Further, embodiments of the base portion 70 may be comprised of plastic, composite materials, hard plastics, an elastomer, a dense rubber, and/or a combination thereof. Some embodiments of the base portion 70 could include some metallic components, or be comprised of metal with at least one high friction element 77 disposed on the bottom surface 74 of the base portion.

Referring back to FIGS. 2 and 3, embodiments of the adapter 100 may include a receiver 50. Embodiments of the receiver 50 may be a receiver, a vehicle engagement member retainer, a retaining structure, a support member for the vehicle engagement member, a trough, a trench, and/or a rack or mount holder. Embodiments of the receiver 50 may be disposed on the base portion 70. For instance, embodiments of the receiver 50 may be positioned on the top surface 73 of the base portion 70; the receiver 50 may be operably attached to the base portion 50 through a variety of means, including but not limited to fasteners, adhesives, and the like. Embodiments of the receiver 50 may be structurally integral to the base portion 50 through a variety of manufacturing methods such as molding methods and welding applications or other methods known to those having skill in the art to structurally integrate the base portion 70 and the receiver 50 so as to form a single device. Furthermore, embodiments of the receiver 50 may be configured to receive a portion of the vehicle mount 600. For example, embodiments of the receiver 50 may receive, accept, accommodate, secure, retain, collect, support, and the like, the vehicle engagement member 650 of the vehicle mount 600 when the vehicle mount 600 is operably attached to the vehicle 600. The reception by the receiver 50 of the adapter 100 may help stabilize the vehicle mount 600 when operably attached to the vehicle 500.

Embodiments of the receiver 50 may have a first end 53 and a second end 54, and may have a first side portion 51 and a second side portion 52 defining a channel 55. Embodiments of the receiver 50 may have a central axis 5 extending axially from the first end 53 to the second end 54 that can divide or at least separate the first side portion 51 and the second side portion 52. The first side portion 51 and the second side portion 52 may be a wall or similar structure configured to collect, corral, confine, or otherwise partially encompass the vehicle engagement member 650 when the vehicle mount 600 is operably attached to the vehicle 500. Embodiments of the channel 55 may extend from the first end 53 to the second end 54 of the receiver 50, and may comprise the void, area, or opening between the first side portion 51 and the second side portion 52; those having skill in the art should appreciate that the channel 55 may also refer to the void, area, or opening proximate or otherwise near the first and second side portion 51, 52. Embodiments of channel 55 may be an opening, a channel, a groove, a tunnel, a pathway, a keyway, a semicircular pathway, and the like. The vehicle engagement member 650, or a portion thereof, may enter and reside within the channel 55 when the vehicle mount 650 is operably attached to the vehicle 500. The retainment of the vehicle engagement member 650, or a portion thereof, within the channel 55 of the receiver 50 may stabilize or otherwise support the vehicle mount 600 when operably attached. Moreover, when the vehicle engagement member 650 is at least partially disposed within the channel 55, a translational movement or sliding of the vehicle engagement member 650 across the top surface 73 of the base portion can be prevented, hindered, eliminated, and can hold the vehicle engagement member 650 stationary or relatively stationary when adding or removing objects from the vehicle mount 600 when the vehicle mount 600 is operably attached to the vehicle 500. Further, embodiments of the receiver 50 may be comprised of plastic, composite materials, hard plastics, an elastomer, a dense rubber, metal, and/or a combination thereof.

Figure 6:
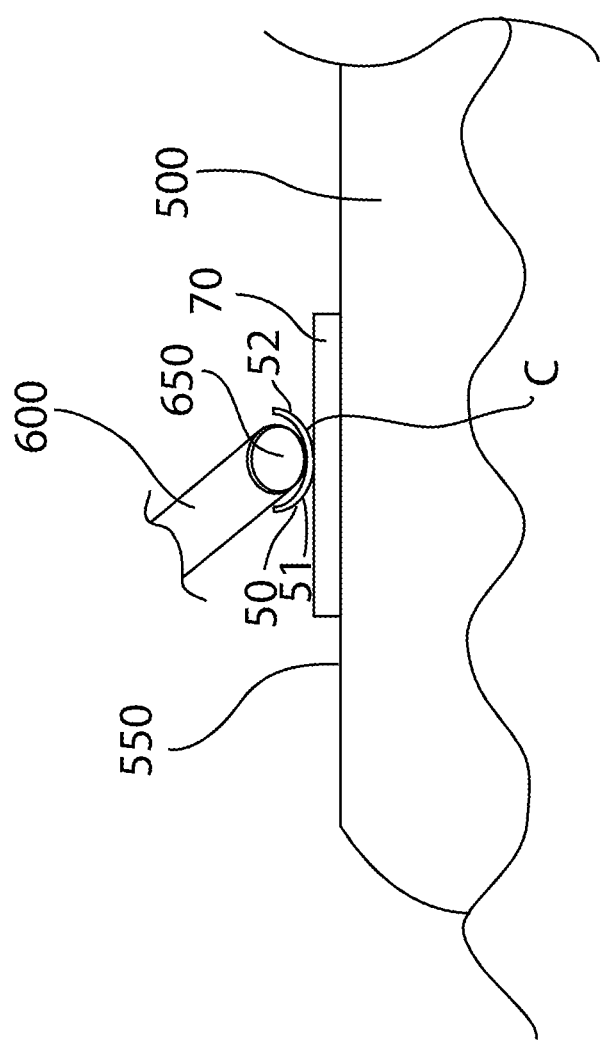
FIG. 6 depicts a side view of an embodiment of the adapter receiving the vehicle mount.
Figure 7:
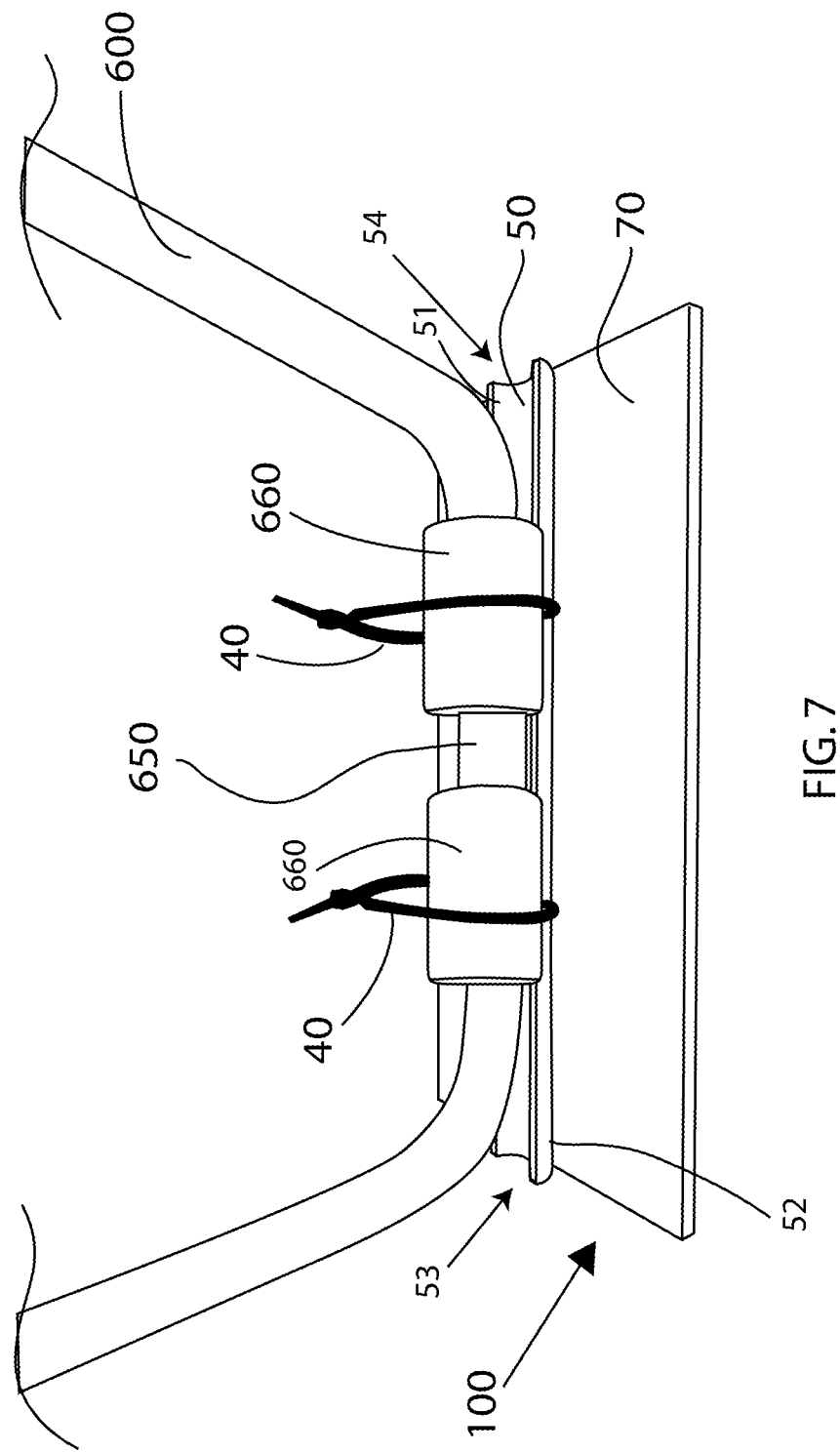
FIG. 7 depicts a front, elevated view of an embodiment of the adapter receiving the vehicle mount.

Referring still to FIGS. 2 and 3, with additional reference to FIGS. 6 and 7, embodiments of the receiver 50 may have a cross-section having a curvature, C. Embodiments of the receiver 50 may have a shape of an axially bisected hollow cylinder, tube, pipe, roll, and the like, resulting in at least one of a C-shape, semi-circular, arcuate, crescent, or curvilinear cross-section. The curvature, C, or shape of the receiver 50 may vary depending on the curvature, girth, diameter, radius and the like, of the vehicle engagement member 650 of the vehicle mount 600. For example, the curvature, C, of the receiver may match a curvature of the vehicle engagement member 650 of the vehicle mount 600 to reduce movement of the vehicle engagement member 650 while residing, at least partially, within the channel 55. However, the curvature, C, or radius of curvature, of the receiver 50 need not match the curvature of the vehicle engagement member 650; the vehicle engagement member(s) 650 may have a smaller or larger diameter and still reside, at least partially within the channel 55 to effectuate a removably secure attachment and retainment of the vehicle engagement member 650. To further retain or restrict movement of the vehicle engagement member 650 when received by the receiver 50, one or more fasteners 40 may be wrapped around at least one of the vehicle engagement member 650 and the pads 660 of the vehicle engagement member 650. The fasteners 40 may extend through the channel 55 of receiver 50 through one or more openings 57 of the receiver 50. For instance, the first side portion 51 and the second side portion 52 may include one or more openings 57, such as holes, that allow a fastener 40 to pass through and ultimately wrap around or otherwise secure the vehicle engagement member 650 to the adapter 100. Embodiments of the fastener 40 may include a strap, a belt, a Velcro® strap, a cable tie, a zip tie, a shoelace, a length of rope, a bungee cord, a length of twine, rubber straps, and the like. In some embodiments, the fasteners 40 may be permanently attached at one side (or both depending on the type of fastener) to the adapter 100.

Figure 8:
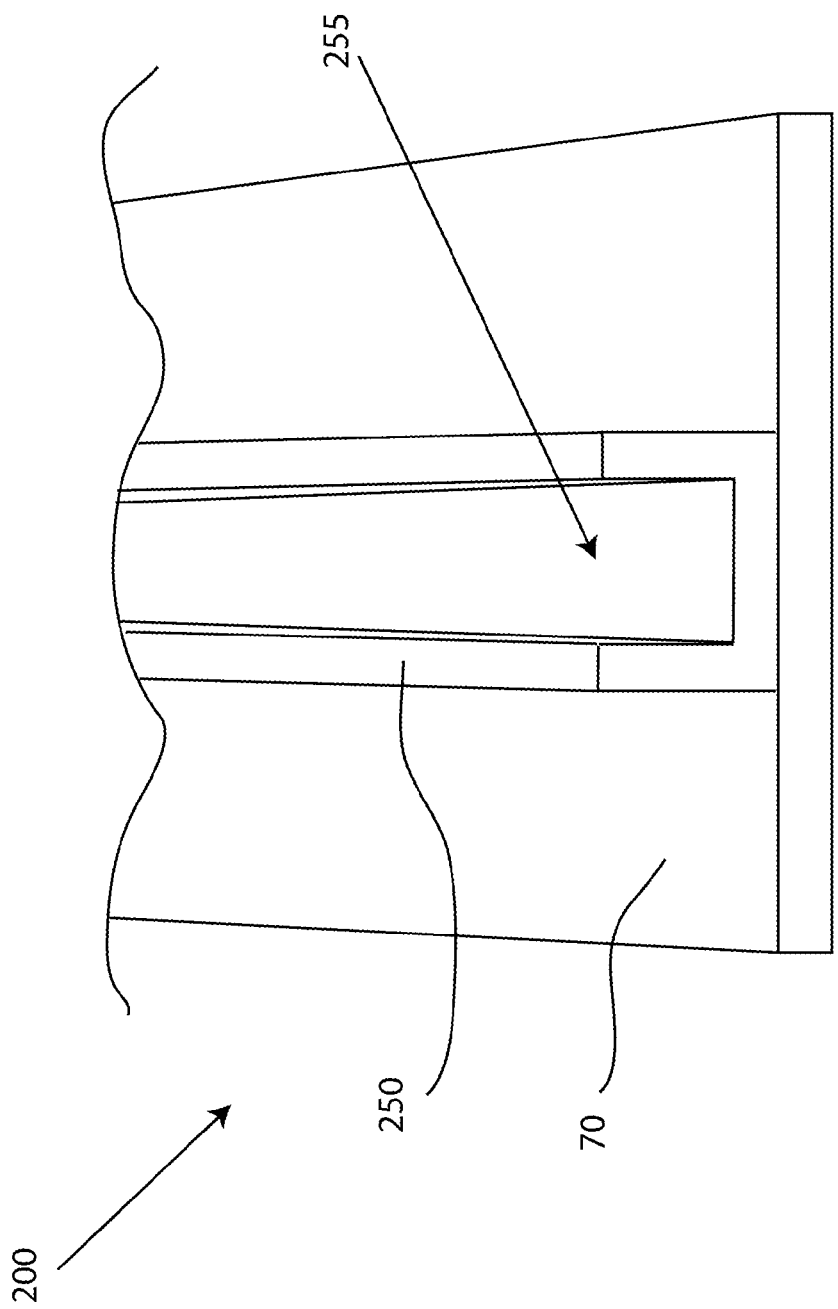
FIG. 8 depicts a front, elevated view of an alternative embodiment of a receiver.

FIG. 8 depicts an embodiment of an adapter 200 having a receiver 250 with a non-curvilinear cross-section. Embodiments of adapter 200 and receiver 250 may include the same or substantially the same structural and functional aspects of adapter 100 and receiver 50, respectively. However, receiver 250 includes a cross-section or shape that is non-curvilinear. In other words, the cross-section of receiver 250 may be polygonal. In some exemplary embodiments, the cross-section of receiver 250 may be rectangular or square shaped. Although embodiments of receiver 250 may still receive and retain a curved or rounded vehicle engagement member 650 within or partially within channel 255, it may better cooperate with a squared or otherwise polygonal vehicle engagement member 650.

Referring back to FIGS. 1 and 6-7, the manner in which a user may utilize the adapter 100, 200 will now be described. A user looking to protect the exterior surface of a vehicle 500 from scratched paint and/or dents when operably attaching a vehicle mount 600, such as a vehicle trunk mount, may place the adapter 100, 200 at a location on a mounting surface 550 of the vehicle where a vehicle engagement member 650 will contact the vehicle 500 in a mounted, attached position. When attaching the vehicle mount 600, or when adjusting the adapter 100, 200 relative to the vehicle engagement member 600, the receiver 50, 250 may mate and/or achieve purchase with the vehicle engagement member 650, as shown in FIGS. 6 and 7. In this mated position, the vehicle engagement member 650 is received by the receiver 50 so that at least a portion of the vehicle engagement 650 resides within the channel 55, 255 of the receiver 50, 250. Moreover, the first and second side portions 51, 52 may restrict or prevent an unwanted dislodgement of the vehicle engagement member 650 from the receiver 50, 250 in a lateral or mostly lateral direction; a plurality of fasteners 40 may be employed to restrict or prevent unwanted dislodgement of the vehicle engagement member 650 from the receiver 50, 250 in a vertical or mostly vertical direction.

With reference now to FIGS. 1-8, a method may include the steps of providing an adapter 100, 200 having a base portion 70, having a top surface 73 and a bottom surface 74, the bottom surface 74 having a high friction element 77, the high friction element 77 reducing a lateral movement of the base portion 70 when positioned on an exterior surface 550 of vehicle 500, a receiver 50 disposed on the base portion 70, preventing a vehicle engagement member 650 of the vehicle mount 600 to directly contact the exterior surface 550 of the vehicle 500 and the vehicle engagement member 650, and distributing a load of the vehicle mount 600 across a surface area of the base portion 70.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An adapter for a vehicle mount comprising:
    a base portion having a top surface and a bottom surface, the base portion removably positioned on an exterior surface of a vehicle; and
    a receiver structurally integral with the base portion and having a first end and a distal second end, the receiver receiving a portion of a vehicle mount to securably engage the portion of the vehicle mount within the receiver, the portion of the vehicle mount being physically unconnected to the receiver when not within the receiver, the receiver having a first side portion having a top end and a second side portion having a top end, the first side portion and the second side portion forming a channel therebetween, the channel extending from the first end of the receiver to the second end of the receiver, wherein the top end of the first side portion and the top end of the second side portion are separated to open up the channel that extends lengthwise between the first end of the receiver and the second end of the receiver;
    wherein a majority of the portion of the vehicle mount that is received within the channel is exposed;
    wherein a load of the vehicle mount is distributed across the surface area of the base portion;
    wherein the channel of the receiver is parallel with a first side of the base portion and perpendicular to a second side of the base portion, the first side of the base portion being substantially longer than the second side of the base portion; wherein the base portion includes only a single receiver to accommodate the vehicle mount.

2. The adapter claim 1, wherein the receiver has a cross-section that corresponds to a cross-section of the portion of the vehicle mount.

3. The adapter of claim 2, wherein the cross-section of the receiver is at least one of arcuate and polygonal.

4. The adapter of claim 1, wherein the base portion is configured to rest upon an exterior surface of a trunk of a vehicle.

5. An adapter comprising:
    a base portion having a top surface and a bottom surface, the base portion removably disposed on a mounting surface of a vehicle when being used to prevent contact between a vehicle engagement member of a vehicle mount and the mounting surface of the vehicle; and
    a channel proximate the base portion, the channel having a first side portion and a second side portion extending axially from a first end of the channel to a second end of the channel, wherein the channel receives the vehicle engagement member of the vehicle mount so that the vehicle engagement member resides between and directly contacts the first side portion and the second side portion of the receiver;
    wherein the receiving of the vehicle engagement member of the vehicle mount by the channel securably retains the vehicle engagement member when the vehicle mount is operably attached to the vehicle, further wherein the vehicle engagement member is completely disengageable from the base portion by movement of the vehicle engagement member in a vertical direction from the channel, the vehicle engagement member being physically unconnected to the base portion after being moved in the vertical direction to completely disengage from the base portion;
    wherein the entire portion of the vehicle mount that is received within the channel is exposed on at least one side of the vehicle mount;
    wherein the channel is parallel with a first side of the base portion and perpendicular to a second side of the base portion, the first side of the base portion being substantially longer than the second side of the base portion; wherein the base portion includes only one channel to accommodate the vehicle mount.

6. The adapter of claim 5, wherein the first side portion and the second side portion each have at least one opening.

7. The adapter of claim 6, wherein a fastener passes through the at least one opening and wraps around the vehicle engagement member to restrict movement of the vehicle engagement member in a vertical with respect to the channel.

8. The adapter claim 5, wherein the channel has a cross-section that corresponds to a cross-section of the portion of the vehicle mount.

9. The adapter of claim 8, wherein the cross-section of the channel is at least one of polygonal and arcuate.

10. The adapter of claim 5, wherein the first side portion and the second side portion restrict a lateral movement of the vehicle engagement member when the vehicle engagement member of the vehicle mount is received by the channel.

11. The adapter of claim 5, wherein the bottom surface of the base portion includes a high friction element, the high friction element is at least one rubber pad attached to the bottom surface of the base portion.

12. The adapter of claim 5, wherein the mounting surface is an exterior surface of a trunk of a vehicle.

* * * * *